United States Patent
Schoeny et al.

(10) Patent No.: US 10,820,490 B2
(45) Date of Patent: Nov. 3, 2020

(54) SYSTEM AND METHOD FOR CONTROLLING THE OPERATION OF A RESIDUE REMOVAL DEVICE OF A SEED-PLANTING IMPLEMENT BASED ON FURROW CLOSING ASSEMBLY PERFORMANCE

(71) Applicant: CNH Industrial America LLC, New Holland, PA (US)

(72) Inventors: Christopher Schoeny, Yorkville, IL (US); Trevor Stanhope, Darien, IL (US)

(73) Assignee: CNH Industrial America LLC, New Holland, PA (US)

( * ) Notice: Subject to any disclaimer, the term of this patent is extended or adjusted under 35 U.S.C. 154(b) by 122 days.

(21) Appl. No.: 16/150,736

(22) Filed: Oct. 3, 2018

(65) Prior Publication Data
US 2020/0107494 A1    Apr. 9, 2020

(51) Int. Cl.
| | |
|---|---|
| *A01C 7/20* | (2006.01) |
| *A01B 27/00* | (2006.01) |
| *A01B 35/28* | (2006.01) |
| *A01C 5/06* | (2006.01) |
| *A01B 76/00* | (2006.01) |
| *A01B 63/00* | (2006.01) |

(52) U.S. Cl.
CPC ............ *A01C 7/205* (2013.01); *A01B 27/005* (2013.01); *A01B 35/28* (2013.01); *A01B 63/008* (2013.01); *A01B 76/00* (2013.01); *A01C 5/064* (2013.01); *A01C 5/068* (2013.01)

(58) Field of Classification Search
CPC ........... A01C 7/205; A01C 7/201; A01C 7/20; A01C 7/00; A01C 5/064; A01C 5/062; A01C 5/06; A01C 5/00; A01C 5/068; A01B 27/005; A01B 27/00; A01B 35/28; A01B 35/20; A01B 35/00; A01B 63/008; A01B 63/002; A01B 63/00; A01B 76/00
See application file for complete search history.

(56) References Cited

U.S. PATENT DOCUMENTS

| | | |
|---|---|---|
| 736,369 A | 8/1903 | Pierce |
| 1,791,462 A | 2/1931 | Bermel |
| 4,669,550 A | 6/1987 | Sittre |

(Continued)

FOREIGN PATENT DOCUMENTS

CN    205755413    12/2016

*Primary Examiner* — Christopher J. Novosad
(74) *Attorney, Agent, or Firm* — Rebecca L. Henkel; Rickard K. DeMille

(57) ABSTRACT

A system for controlling an operation of a residue removal device of a seed-planting implement. The system may include a residue removal device configured to remove residue from a path of the seed-planting implement. The system may also include a furrow closing assembly including at least one closing disc, which is configured to close a furrow formed in the soil by the seed-planting implement. Furthermore, the system may include a sensor configured to capture data indicative of an operational parameter of the furrow closing assembly and a controller communicatively coupled to the sensor. The controller may be configured to monitor the operational parameter based on the data received from the sensor, and to control an operation of the residue removal device based on the monitored operational parameter.

20 Claims, 4 Drawing Sheets

(56) References Cited

U.S. PATENT DOCUMENTS

| | | |
|---|---|---|
| 6,575,104 B2 | 6/2003 | Brummelhuis |
| 7,673,570 B1 | 3/2010 | Bassett |
| 7,730,962 B1 | 6/2010 | Kester |
| 8,356,563 B2 | 1/2013 | Schaffert et al. |
| 8,393,407 B2 | 3/2013 | Freed |
| 8,544,397 B2 | 10/2013 | Bassett |
| 8,550,020 B2 | 10/2013 | Sauder et al. |
| 8,939,095 B2 | 1/2015 | Freed |
| 9,814,172 B2 | 11/2017 | Achen et al. |
| 9,883,626 B2 | 2/2018 | Heim et al. |
| 2015/0264857 A1* | 9/2015 | Achen ............... A01B 49/06 111/149 |
| 2017/0202130 A1 | 7/2017 | Schoolman et al. |

\* cited by examiner

SYSTEM AND METHOD FOR CONTROLLING THE OPERATION OF A RESIDUE REMOVAL DEVICE OF A SEED-PLANTING IMPLEMENT BASED ON FURROW CLOSING ASSEMBLY PERFORMANCE

FIELD OF THE INVENTION

The present disclosure generally relates to seed-planting implements and, more particularly, to systems and methods for controlling the operation of a residue removal device of a seed-planting implement based on furrow closing assembly performance.

BACKGROUND OF THE INVENTION

Modern farming practices strive to increase yields of agricultural fields. In this respect, seed-planting implements are towed behind a tractor or other work vehicle to disperse seed throughout a field. For example, seed-planting implements typically include one or more furrow forming tools or openers that form a furrow or trench in the soil. One or more dispensing devices of the seed-planting implements may, in turn, deposit the seeds into the furrow(s). After deposition of the seeds, a furrow closing assembly may close the furrow in the soil and a packer wheel may pack the soil on top of the deposited seeds.

In certain configurations, a seed-planting implement may include one or more residue removal devices positioned forward of the opener(s), the closing assembly, and the packer wheel of the seed-planting implement relative to the direction of travel of the implement. In general, the residue removal device(s) are configured to break up and sweep away residue and dirt clods present within the path of the implement. Based on its function, the operation of the residue removal device(s) may affect the performance of other downstream components of the seed-planting implement, such as the furrow closing assembly.

Accordingly, an improved system and method for controlling the operation of residue removal device of a seed-planting implement based on the performance of a furrow closing assembly of the implement would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for controlling the operation of a residue removal device of a seed-planting implement. The system may include a residue removal device configured to remove residue from a path of the seed-planting implement. The system may also include a furrow closing assembly including at least one closing disc, with the furrow closing assembly configured to close a furrow formed in the soil by the seed-planting implement. Furthermore, the system may include a sensor configured to capture data indicative of an operational parameter of the furrow closing assembly and a controller communicatively coupled to the sensor. The controller may be configured to monitor the operational parameter based on the data received from the sensor, the controller further configured to control an operation of the residue removal device based on the monitored operational parameter.

In another aspect, the present subject matter is directed to a method for controlling the operation of a residue removal device of a seed-planting implement. The residue removal device may be configured to remove residue from a path of the seed-planting implement. The method may include controlling, with a computing device, an operation of the seed-planting implement as the implement is being moved across the field. The implement may also include a furrow closing assembly having at least one closing disc, with the furrow closing assembly configured to close a furrow formed in the soil by the seed-planting implement. The method may also include monitoring, with the computing device, an operational parameter of the furrow closing assembly. Furthermore, the method including controlling, with the computing device, an operation of the residue removal device based on the monitored operational parameter.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
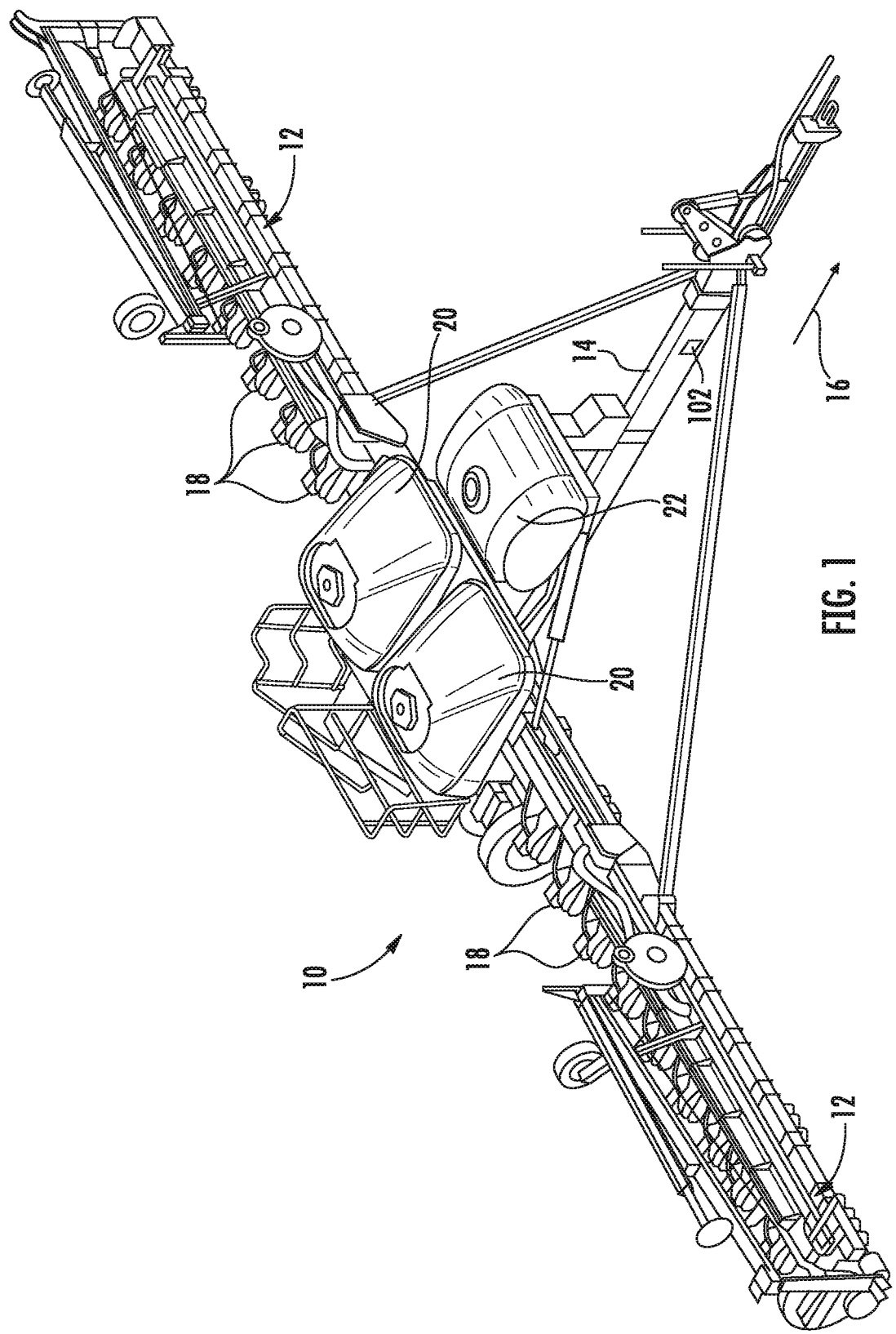
FIG. 1 illustrates a perspective view of one embodiment of a seed-planting implement in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for controlling the operation of a residue removal device of a seed-planting implement. Specifically, in several embodiments, a controller of the disclosed system may be configured to receive data indicative of an operational parameter of a furrow closing assembly of the seed-planting implement. The operational parameter may, in turn, be indicative of the performance of the furrow closing assembly. For example, in one embodiment, the operational parameter may be the rotational speed of a closing disc of the furrow closing assembly. In such an embodiment, when the rotational speed falls below a minimum rotation speed threshold, the controller may be configured to determine that soil is not properly flowing through the furrow closing assembly such that the furrow closing assembly may be "plugged" with soil and/or residue. As such, the controller may be configured to control the operation of the residue removal device based on the monitored operational parameter. For instance, when it is determined that the soil is not properly flowing through the furrow closing assembly, the controller may be configured to initiate adjustment of the downforce applied to the residue removal device in a manner that increases the aggressiveness with which the residue removal device breaks up and sweeps away residue from the path of the implement.

Referring now to the drawings, FIG. 1 illustrates a perspective view of one embodiment of a seed-planting implement 10 in accordance with aspects of the present subject matter. It should be appreciated that, although the seed-planting implement 10 illustrated herein corresponds to a planter, the seed-planting implement 10 may generally correspond to any suitable equipment or implement, such as seeder (e.g., a seed disc drill) or another seed dispensing implement, a side dresser or another fertilizer dispensing implement, a strip tiller, and/or the like.

As shown in FIG. 1, the implement 10 may include a laterally extending toolbar or frame assembly 12 connected at its middle to a forwardly extending tow bar 14 to allow the implement 10 to be towed by a work vehicle (not shown), such as an agricultural tractor, in a direction of travel (e.g., as indicated by arrow 16 in FIG. 1). The toolbar 12 may generally be configured to support a plurality of seed planting units (or row units) 18. As is generally understood, each row unit 18 may be configured to deposit seeds at a desired depth beneath the soil surface and at a desired seed spacing as the implement 10 is being towed by the work vehicle, thereby establishing rows of planted seeds. In some embodiments, the bulk of the seeds to be planted may be stored in one or more hoppers or seed tanks 20. Thus, as seeds are planted by the row units 18, a pneumatic distribution system may distribute additional seeds from the seed tanks 20 to the individual row units 18. Additionally, one or more fluid tanks 22 may store agricultural fluids, such as insecticides, herbicides, fungicides, fertilizers, and/or the like.

It should be appreciated that, for purposes of illustration, only a portion of the row units 18 of the implement 10 have been shown in FIG. 1. In general, the implement 10 may include any number of row units 18, such as six, eight, twelve, sixteen, twenty-four, thirty-two, or thirty-six row units. In addition, it should be appreciated that the lateral spacing between row units 18 may be selected based on the type of crop being planted. For example, the row units 18 may be spaced approximately thirty inches from one another for planting corn, and approximately fifteen inches from one another for planting soybeans.

Furthermore, a soil moisture sensor 102 may be provided operative association with the implement 10. As such, the soil moisture sensor 102 may be configured to detect a parameter associated with the moisture content of the soil within the field across which the implement 10 is being moved. For example, in one embodiment, the soil moisture sensor 102 may be configured as an optical sensor configured to detect one or more characteristics of light reflected by the soil, with such characteristics generally being indicative of the soil moisture content. However, it should be appreciated that, in alternative embodiments, the soil moisture sensor 102 may be configured as any other suitable device for sensing or detecting the moisture content of the soil.

It should also be appreciated that the configuration of the seed-planting implement 10 described above and shown in FIG. 1 is provided only to place the present subject matter in an exemplary field of use. Thus, it should be appreciated that the present subject matter may be readily adaptable to any manner of implement configuration.

Figure 2:
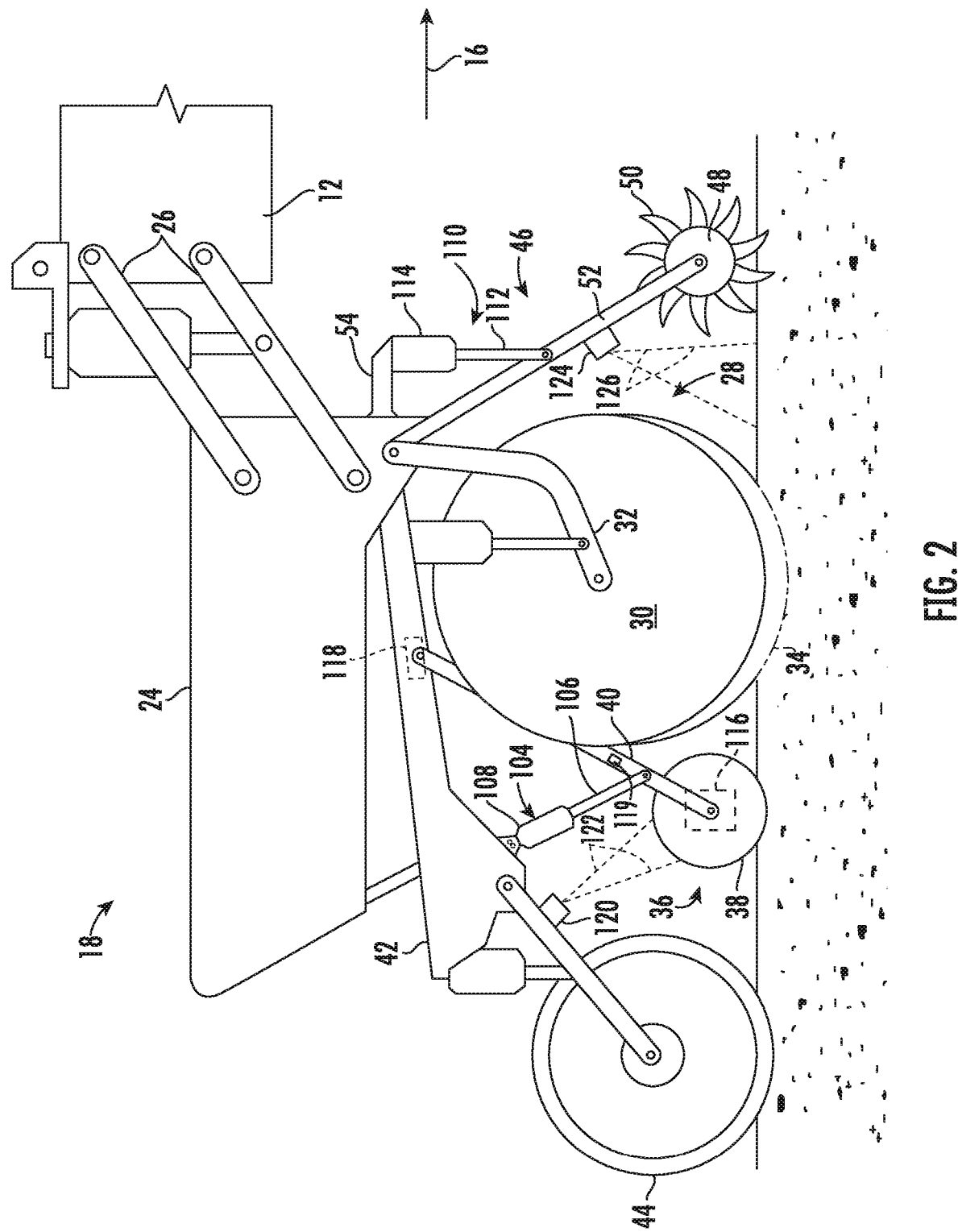
FIG. 2 illustrates a side view of one embodiment of a row unit suitable for use with a seed-planting implement in accordance with aspects of the present subject matter.

Referring now to FIG. 2, a side view of one embodiment of a row unit 18 is illustrated in accordance with aspects of the present subject matter. As shown, the row unit 18 may include a frame 24 adjustably coupled to the toolbar 12 by links 26. For example, one end of each link 26 may be pivotably coupled to the frame 24, while an opposed end of each link 26 may be pivotably coupled to the toolbar 12. In one embodiment, the links 26 may be parallel. However, it should be appreciated that, in alternative embodiments, the row unit 18 may be coupled to the toolbar 12 in any other suitable manner.

As shown in FIG. 2, the row unit 18 also includes a furrow opening assembly 28. For example, in one embodiment, the furrow opening assembly 28 may include a gauge wheel 30 operatively coupled to the frame 24 of the row unit 18 via a support arm 32. Furthermore, the opening assembly 28 may also include one or more opener discs 34 configured to excavate a furrow or trench in the soil. As is generally understood, the gauge wheel 30 may be configured to engage the top surface of the soil as the implement 10 is moved across the field. In this regard, the height of the opener disc(s) 34 may be adjusted with respect to the position of the gauge wheel 30 to set the desired depth of the furrow being excavated.

Moreover, as shown, the row unit 18 may include a furrow closing assembly 36. Specifically, in several embodiments, the furrow closing assembly 28 may include a pair of closing discs 38 positioned relative to each other in a manner that permits soil to flow between the discs 38 as the implement 10 is being moved across the field. As such, the closing discs 38 may be configured to close the furrow after seeds have been deposited therein, such as by pushing the excavated soil into the furrow. Furthermore, the furrow closing assembly 36 may include a support arm 40 configured to adjustably couple the closing discs 38 to the frame assembly 24. For example, one end of the support arm 40 may be pivotably coupled to the closing discs 38, while an opposed end of the support arm 40 may be pivotably coupled to a chassis arm 42, which is, in turn, coupled to the frame 24. However, it should be appreciated that, in alternative embodiments, the closing discs 38 may be coupled to the frame 24 in any other suitable manner. Furthermore, it should be appreciated that, in alternative embodiments, the furrow closing assembly 36 may include any other suitable number of closing discs 38, such as one closing disc 38 or three or more closing discs 38. For example, in one embodiment, the furrow closing assembly 36 may include a pair of closing discs 38. In such an embodiment, the closing discs 38 may positioned in a manner that permits soil to flow between the discs 38 as the implement 10 is being moved across the field. Additionally, the row unit 18 may include a press wheel 44 configured to roll over the closed furrow to firm the soil over the seed and promote favorable seed-to-soil contact.

In one embodiment, an actuator 104 may be configured to move or otherwise adjust the position of the furrow closing assembly 36 relative to the frame 24. For example, as shown in the illustrated embodiment, a first end of the actuator 104 (e.g., a rod 106 of the actuator 108) may be coupled to the support arm 40 of the furrow closing assembly 36, while a second end of the actuator 104 (e.g., the cylinder 108 of the actuator 104) may be coupled to the chassis arm 42, which is, in turn, coupled to the frame 24. The rod 106 of the actuator 104 may be configured to extend and/or retract relative to the cylinder 108 to adjust the downforce being applied to and/or the penetration depth of the closing disc(s) 38. In addition, such extension and/or retraction may move the furrow closing assembly 36 between an operating position relative to the ground in which the closing disc(s) 38 engages the soil and a raised position relative to the ground in which the closing disc(s) 38 is lifted out of the soil. In the illustrated embodiment, the actuator 104 corresponds to a fluid-driven actuator, such as hydraulic or pneumatic cylinder. However, it should be appreciated that the actuator 104 may correspond to any other suitable type of actuator, such as an electric linear actuator. Additionally, it should be appreciated that, in alternative embodiments, the actuator 104 may control the position(s) of the closing disc(s) 38 by adjusting the downforce being applied to the closing disc(s) 38

In accordance with aspects of the present subject matter, a residue removal device 46 may be positioned at the forward end of the row unit 18 relative to the direction of travel 16. In this regard, the residue removal device 46 may be configured to break up and/or sweep away residue, dirt clods, and/or the like from the path of the row unit 18 before the furrow is formed in the soil. For example, in one embodiment, the residue removal device 46 may include one or more residue removal wheels 48, with each wheel 48 having a plurality of tillage points or fingers 50. As such, the wheel(s) 48 may be configured to roll relative to the soil as the implement 10 is moved across the field such that the fingers 50 break up and/or sweep away residue and dirt clods. Additionally, the residue removal device 46 may include a support arm 52 configured to adjustably couple the residue removal wheel(s) 48 to the frame assembly 24. For example, one end of the support arm 52 may be pivotably coupled to the wheel(s) 48, while an opposed end of the support arm 52 may be pivotably coupled to a bracket 54, which is, in turn, coupled to the frame 24. However, it should be appreciated that, in alternative embodiments, the residue removal wheel(s) 48 may be coupled to the frame 24 in any other suitable manner. Furthermore, although only one residue removal wheel 48 is shown in FIG. 2, it should be appreciated that, in alternative embodiments, the residue removal device 46 may include any other suitable number of residue removal wheels 48. For example, in one embodiment, the residue removal device 46 may include a pair of residue removal wheels 48.

In several embodiments, an actuator 110 may be configured to move or otherwise adjust the position of the residue removal device 46 relative to the frame 24. For example, as shown in the illustrated embodiment, a first end of the actuator 110 (e.g., a rod 112 of the actuator 110) may be coupled to the support arm 52 of the residue removal device 46, while a second end of the actuator 110 (e.g., the cylinder 114 of the actuator 110) may be coupled to the bracket 54, which is, in turn, coupled to the frame 24. The rod 112 of the actuator 110 may be configured to extend and/or retract relative to the cylinder 114 to adjust the downforce being applied to the residue removal wheel(s) 48. As such, increasing the downforce being applied to the residue removal wheel(s) 48 may increase the aggressiveness with which the removal wheel(s) 48 breaks up and sweeps away the residue and/or dirt clods. Conversely, decreasing the downforce being applied to the residue removal wheel(s) 48 may decrease the aggressiveness with which the removal wheel(s) 48 breaks up and sweeps away the residue and/or dirt clods. In the illustrated embodiment, the actuator 110 corresponds to a fluid-driven actuator, such as hydraulic or pneumatic cylinder. However, it should be appreciated that the actuator 110 may correspond to any other suitable type of actuator, such as an electric linear actuator.

Furthermore, a rotational speed sensor 116 may be provided in operative association with the furrow closing assembly 36 of the row unit 18. As such, the rotational speed sensor 116 may be configured to detect a parameter associated with the rotational speed of one or more of the closing discs 38 as which the implement 10 is moved across the field. For example, in one embodiment, the rotational speed sensor 116 may be configured as a Hall Effect sensor configured to detect the rotational speed of the closing disc(s) 38 relative to an axle or shaft on which the closing disc(s) 38 are mounted relative to the support arm 40. However, it should be appreciated that, in alternative embodiments, the rotational speed sensor 116 may be configured as any other suitable device for sensing or detecting the rotational speed of the closing disc(s) 38.

Additionally, a depth sensor 118 may be provided in operative association with the furrow closing assembly 36 of the row unit 18. As such, the depth sensor 118 may be configured to detect a parameter associated with the depth to which the closing disc(s) 38 penetrates the soil. For example, in one embodiment, the depth sensor 118 may be configured as a potentiometer configured to detect the angle defined between the support arm 40 on which the closing disc(s) 38 is mounted and the chassis arm 42 to which the arm 40 is coupled. The angle between the support arm 40 and the chassis arm 42 may, in turn, be indicative of the penetration depth of the closing disc(s) 38. However, it should be appreciated that, in alternative embodiments, the depth sensor 118 may be configured as any other suitable device for sensing or detecting the rotational speed of the closing disc(s) 38. For example, in one embodiment, the depth sensor 118 may be configured as a linear potentiometer configured to detect extension and retraction of the rod 106 of the actuator 104 relative to the cylinder 108 of the actuator 104.

Further, a load sensor 119 may be provided in operative association with the furrow closing assembly 36 of the row unit 18. As such, the load sensor 119 may be configured to detect a parameter associated with the draft load being applied to one or more of the closing discs 38 as which the implement 10 is moved across the field. For example, in one embodiment, the load sensor 19 may be configured as a strain gauge mounted on the support arm 40 and configured to detect the force exerted thereon by the draft load on the closing disc(s) 38. However, it should be appreciated that, in alternative embodiments, the load sensor 119 may be configured as any other suitable device for sensing or detecting the draft load on the closing disc(s) 38. For example, in one alternative embodiment, the load sensor 119 may be configured as a load pin coupled between one of the closing discs 38 and the support arm 40.

Moreover, in one embodiment, a plugging sensor 120 may be provided in operative association with the row unit 18. Specifically, in several embodiments, the plugging sensor 120 may be configured to capture data indicative of "plugging" of the furrow closing assembly 36. In general, the furrow closing assembly 36 may be plugged when soil and/or residue become trapped between adjacent closing discs 38 in a manner that prevents the soil from flowing through the furrow closing assembly 36 as the implement 10 is moved across the field. In general, the closing discs 38 may not rotate freely relative to the ground when the furrow closing assembly 36 is plugged. In one embodiment, the plugging sensor 120 may be a vision-based or Radio Detection and Ranging (RADAR) based sensor mounted or installed on the row unit 18 such that the plugging sensor 120 has a field of view or sensor detection range (e.g., as indicated by dashed lines 122 in FIG. 2) directed towards the closing discs 38 of the furrow closing assembly 36. As such, the plugging sensor 120 may be configured to capture plugging data (e.g., vision-based or Radio Detection and Ranging (RADAR) based data) of the soil flowing through the furrow closing assembly 36 as the implement 10 is moved across the field.

Additionally, in one embodiment, a residue sensor 124 may be provided in operative association with the row unit 18. Specifically, in several embodiments, the residue sensor 124 may be configured to capture data indicative of the presence and/or amount of residue within at least a portion of the field across which the implement 10 is being moved. For example, in one embodiment, the residue sensor 124 may be a vision-based or Radio Detection and Ranging (RADAR) based sensor mounted or installed on the support arm 52 of the residue removal device 46 such that the residue sensor 124 has a field of view or sensor detection range (e.g., as indicated by dashed lines 126 in FIG. 2) directed towards the furrow being formed by the furrow opening assembly 28. As such, the residue sensor 124 may be configured to capture residue data (e.g., vision-based or RADAR-based data) of the furrow being formed as the implement 10 is moved across the field, with such residue data being indicative of the presence of residue within the furrow. It should be appreciated that, in alternative embodiments, the residue sensor 124 may be installed at any other suitable location(s) on the row unit 18 or the implement 10. For example, in one embodiment, the residue sensor 124 may be mounted on the row unit 18 (e.g., on the frame 24) such that the sensor 124 is configured to capture data of a section of the field in front of the row unit 18. Additionally, it should be appreciated that the implement 10 may only include one residue sensor 124 (e.g., mounted on the toolbar 12) or one or more residue sensors 124 mounted on each of the row units 18.

Moreover, it should be appreciated that the plugging sensor 120 and/or the residue sensor 124 may correspond to any suitable sensing device(s) configured to detect or capture vision-based data (e.g., images, point cloud data, and/or the like) or RADAR-based date associated with the soil and/or residue present within an associated field of view. For example, in several embodiments, the plugging sensor 120 and/or the residue sensor 124 may correspond to Light Detection and Ranging (LIDAR) sensors or RADAR sensors. However, in alternative embodiments, the plugging sensor 120 and/or the residue sensor 124 may correspond to any other suitable vision-based or beam-based sensing device(s), such as optical beam sensors and/or cameras.

It should be appreciated that the configuration of the row unit 18 described above and shown in FIG. 2 is provided only to place the present subject matter in an exemplary field of use. Thus, it should be appreciated that the present subject matter may be readily adaptable to any manner of row unit configuration.

Figure 3:
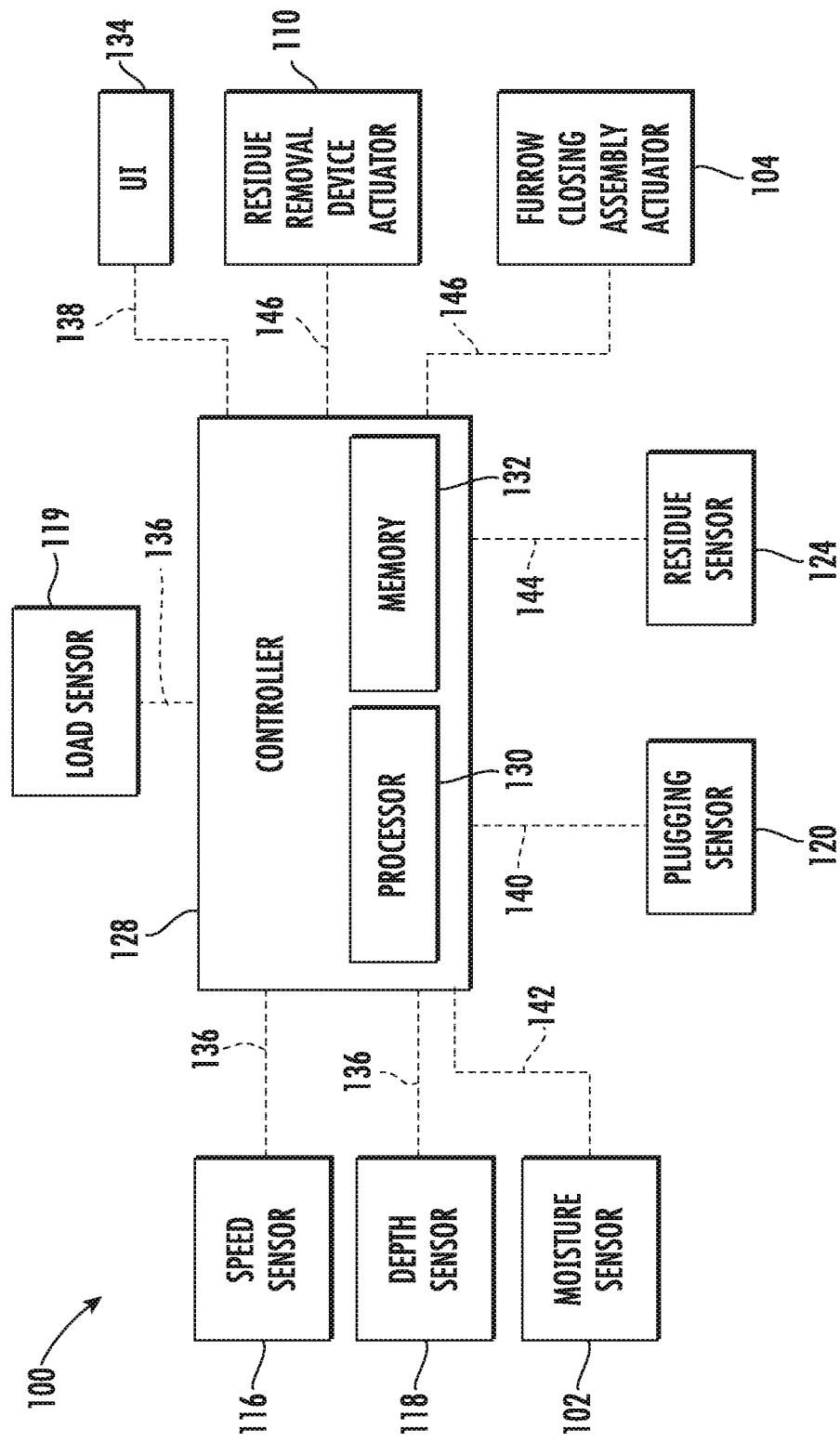
FIG. 3 illustrates a schematic view of one embodiment of a system for controlling the operation of a residue removal device of a seed-planting implement in accordance with aspects of the present subject matter.

Referring now to FIG. 3, a perspective view of one embodiment of a system 100 controlling the operation of a residue removal device of a seed-planting implement is illustrated in accordance with aspects of the present subject matter. In general, the system 100 will be described herein with reference to the implement 10 and row unit 18 described above with reference to FIGS. 1 and 2. However, it should be appreciated by those of ordinary skill in the art that the disclosed system 100 may generally be utilized with seed-planting implements having any other suitable implement configuration and/or row units having any other suitable row unit configuration.

As shown in FIG. 3, the system 100 may include one or more components of the seed-planting implement 10 and/or the row unit 18. For example, in several embodiments, the system 100 may include one or more sensors configured to capture data indicative of one or more operational parameters of the furrow closing assembly 36, such as the rotational speed sensor 116, the depth sensor 118, the load sensor 119, and/or plugging sensor 120. Additionally, in one embodiment, the system may also include one or more secondary sensors configured to capture secondary data indicative of one or more field condition(s) of the field across which the implement 10 is being moved, such as the soil moisture sensor 102 and/or the residue sensor 124. However, it should be appreciated that, in alternative embodiments, the system 100 may include any other suitable components of the implement 10 and/or row unit 18.

In accordance with aspects of the present subject, the system 100 may include a controller 128 configured to electronically control the operation of one or more components of the implement 10. In general, the controller 128 may comprise any suitable processor-based device known in the art, such as a computing device or any suitable combination of computing devices. Thus, in several embodiments, the controller 128 may include one or more processor(s) 130 and associated memory device(s) 132 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 132 of the controller 128 may generally comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 132 may generally be configured to store suitable computer-readable instructions that, when implemented by the processor(s) 130, configure the controller 128 to perform various computer-implemented functions, such as one or more aspects of the method 200 described below with reference to FIG. 4. In addition, the controller 128 may also include various other suitable components, such as a communications circuit or module, one or more input/output channels, a data/control bus and/or the like.

It should be appreciated that the controller 128 may correspond to an existing controller of the implement 10 or an associated work vehicle (not shown) or the controller 128 may correspond to a separate processing device. For instance, in one embodiment, the controller 128 may form all or part of a separate plug-in module that may be installed within the implement 10 or associated work vehicle to allow for the disclosed system and method to be implemented without requiring additional software to be uploaded onto existing control devices of the implement 10 or the associated work vehicle.

Furthermore, in one embodiment, the system 100 may also include a user interface 134. More specifically, the user interface 134 may be configured to provide feedback (e.g., notifications associated with the operational parameters of the furrow closing assembly 36) to the operator of the implement 10. As such, the user interface 134 may include one or more feedback devices (not shown), such as display screens, speakers, warning lights, and/or the like, which are configured to communicate such feedback. In addition, some embodiments of the user interface 134 may include one or more input devices (not shown), such as touchscreens, keypads, touchpads, knobs, buttons, sliders, switches, mice, microphones, and/or the like, which are configured to receive user inputs from the operator. In one embodiment, the user interface 134 may be positioned within a cab of a work vehicle configured to tow the implement 10 across the field. However, in alternative embodiments, the user interface 134 may have any suitable configuration and/or be positioned in any other suitable location.

In several embodiments, the controller 128 may be configured to monitor one or more operational parameters of the furrow closing assembly 36 as the implement 10 is being moved across the field. Specifically, in one embodiment, the controller 128 may be communicatively coupled to rotational speed sensor 116, the depth sensor 118, and/or the load sensor 119 via wired or wireless connection to allow operational parameter data (e.g., as indicated by dashed lines 136 in FIG. 3) to be transmitted from the rotational speed sensor 116, the depth sensor 118, and/or the load sensor 119 to the controller 128. As such, the controller 128 may be configured to determine or estimate the rotational speed, the penetration depth, and/or the draft load of of the closing disc(s) 38 based on the received operational parameter data 136. For instance, the controller 128 may include a lookup-up table, suitable mathematical formula, and/or algorithms stored within its memory 132 that correlates the received operational parameter data 136 to the rotational speed, the penetration depth, and/or the draft load of the closing disc(s) 38.

Furthermore, the controller 128 may be configured to initiate one or more control actions when it is determined that the monitored operational parameter(s) have fallen outside of an associated operational parameter range(s). Specifically, in several embodiments, the controller 128 may be configured to compare the values associated with the monitored operational parameter(s) to a predetermined operational parameter range(s). Thereafter, in the event that the values of the monitored operational parameter(s) exceeds a maximum operational parameter value threshold for the given operational parameter range or falls below a minimum operational parameter value threshold for such range (thereby indicating that the value of the operational parameter may be too high or too low), the controller 128 may be configured to initiate one or more control actions.

In one embodiment, the controller 128 may be configured to notify the operator of implement 10 that the value of the monitored operational parameter has fallen outside of the predetermined operational parameter range. Specifically, in one embodiment, the controller 128 may be communicatively coupled to the user interface 134 via a wired or wireless connection to allow feedback signals (e.g., indicated by dashed line 138 in FIG. 3) to be transmitted from the controller 128 to the user interface 134. In such embodiment, the feedback signals 138 may instruct the user interface 134 to provide a notification to the operator of the implement 10 (e.g., by causing a visual or audible notification or indicator to be presented to the operator) that provides an indication that the value of the monitored operational parameter has fallen outside of the predetermined operational parameter range. In such instances, the operator may then choose to initiate any suitable corrective action he/she believes is necessary, such as adjusting the downforce applied to the residue removal device 46 and/or adjusting the position of the furrow closing assembly 36. Additionally, as will be described below, the controller 128 may be configured actively control of one or more components of the implement 10, such as the residue removal device 46 and/or the furrow closing assembly 36, when it is determined the values of the operational parameter(s) have otherwise fallen outside of the associated operational parameter range(s).

Furthermore, the controller 128 may be configured to determine that the furrow closing assembly 36 is plugged when the operational parameter(s) have otherwise fallen outside of the associated operational parameter range(s). For example, as indicated above, in one embodiment, the operational parameter(s) may include the rotational speed of the closing disc(s) 38. In general, when the closing disc(s) 38 are plugged with soil and/or residue, the closing disc(s) 38 may be unable to rotate freely as the implement 10 is moved across the field such that the rotational speed of the closing disc(s) 38 is reduced. As such, the controller 128 may be configured to compare the values associated with the rotational speed of the closing disc(s) 38 to a minimum rotational speed threshold. Thereafter, in the event that the values of the monitored rotational speed falls below the minimum rotational speed threshold (thereby indicating that the closing disc(s) 38 are not rotating freely), the controller 128 may be configured to determine that the furrow closing assembly 38 is plugged.

Additionally, in one embodiment, the controller 128 may be configured to determine that the furrow closing assembly 36 is plugged based on data received from another one of the operating parameter sensor, namely the plugging sensor 120. Specifically, the controller 128 may be communicatively coupled to the plugging sensor 120 via wired or wireless connection to allow the plugging data (e.g., as indicated by dashed line 140 in FIG. 3) to be transmitted from the plugging sensor 120 to the controller 128. As indicated above, the data 140 received from the plugging sensor 120 may be indicative of the soil flowing through the furrow closing assembly 36 as the implement 10 is moved across the field. In this regard, the controller 128 may be configured to process or analyze the received data 140 to determine when the furrow closing assembly 36 is plugged or soil is otherwise not properly flowing through the furrow closing assembly 36. For example, the controller 128 may include any suitable data processing algorithms stored within its memory 132 or may otherwise use any suitable data processing techniques to determine when the furrow closing assembly 36 is plugged based on the plugging data 140.

Moreover, in several embodiments, the controller 128 may be further configured to monitor a field condition of the field across which the implement 10 is being moved based data received from one or more secondary sensors. Specifically, in one embodiment, the controller 128 may be communicatively coupled to the soil moisture sensor 102 via wired or wireless connection to allow field condition data (e.g., as indicated by dashed lines 142 in FIG. 3) to be transmitted from the soil moisture sensor 102 to the controller 128. As such, the controller 128 may be configured to determine or estimate the soil moisture of the soil within the field based on the received field condition data 140. For instance, the controller 128 may include a lookup-up table, suitable mathematical formula, and/or algorithms stored within its memory 132 that correlates the field condition data 140 to the soil moisture of the soil within the field.

Moreover, in one embodiment, the controller 128 may be configured to identify the presence and/or determine the amount of residue within the field based on data received from another one of the secondary sensors, namely the residue sensor 124. Specifically, the controller 128 may be communicatively coupled to the residue sensor 124 via wired or wireless connection to allow the residue data (e.g., as indicated by dashed line 144 in FIG. 3) to be transmitted from the residue sensor 124 to the controller 128. In this regard, the controller 128 may be configured to process or analyze the received data 144 to identify the presence and/or determine the amount of residue within the field. For example, the controller 128 may include any suitable data processing algorithms stored within its memory 132 or may otherwise use any suitable data processing techniques to identify residue within the received residue data 144.

In accordance with aspects of the present subject matter, the controller 128 may be configured to control the operation of the residue removal device 46 based on the monitored operational parameter(s). Specifically, as shown in FIG. 3, the controller 128 may be communicatively coupled to one or more components of the residue removal device 46, such as the actuator 110, via a wired or wireless connection to allow control signals (e.g., indicated by dashed lines 146 in FIG. 3) to be transmitted from the controller 128 to the actuator 110. As such, the controller 128 may be configured to transmit control signals 146 to actuator 110 instructing the actuator 110 to adjust the downforce being applied to the residue removal device 46, such as by extending or retracting the actuator's rod 112 relative to the corresponding cylinder 114. For example, when it is determined that the monitored rotational speed of the closing disc(s) 38 has fallen below the minimum rotational speed threshold, the controller 128 may be configured to transmit control signals 146 to the actuator 110 instructing the actuator 110 to increase the downforce being applied to the residue removal device 46. The increase in downforce may cause the residue removal device 46 to more aggressively break up and/or remove residue, dirt clods, and/or the like from the path of the implement 10 to prevent additional residue and/or soil from becoming trapped within the furrow closing assembly 36. Conversely, when it is determined that the monitored penetration depth of the closing disc(s) 38 is less than a minimum penetration depth threshold, the controller 128 may be configured to transmit control signals 146 to the actuator 110 instructing the actuator 110 to decrease the downforce being applied to the residue removal device 46. The decrease in downforce may reduce the aggressiveness of the residue removal device in a manner that prevents the residue removal device 46 from sweeping away the top layer of soil (e.g., the loose tilled soil) from the path of the implement 10 such that the penetration depth of the closing disc(s) 38 is increased.

Furthermore, the controller 128 may be configured to control the operation of the residue removal device 46 based on a combination of the monitored operational parameter(s) and the monitored field condition. For example, as indicated above, the controller 128 may be configured to monitor the soil moisture of the soil within the field across which the implement 10 is being moved. In this regard, when it is determined that the furrow closing assembly 36 is plugged, the controller 128 may be configured to determine whether the furrow closing assembly 36 is plugged with primarily soil or primarily residue based on the monitored soil moisture. For example, in the event that the value of the monitored soil moisture exceeds a soil moisture threshold (thereby indicating that the soil is wet and likely "muddy"), the controller 128 may be configured to determine that the furrow closing assembly 36 is primarily plugged with soil. In such instances, the controller 128 may not adjust the downforce of the residue removal device 46 as increased aggressiveness in breaking up and removing residue and dirt clods from the path of the implement 10 is unlikely to prevent further plugging. Conversely, in the event that the value of the monitored soil moisture falls below the soil moisture threshold (thereby indicating that the soil is dry), the controller 128 may be configured to determine that the furrow closing assembly 36 is primarily plugged with residue. In such instances, the controller 128 may be configured to increase the down force being applied to the residue removal device 46 in a manner that causes the residue removal device 46 to more aggressively break up and sweep residue out of the path of the implement 10.

Moreover, in one embodiment, the controller 128 may be configured to control the operation of the residue removal device 46 based on the monitored amount of residue present within the field. For example, as indicated above, the controller 128 may be configured to monitor the amount of residue present within the field. In this regard, the controller 128 may be configured to compare the monitored residue amount within the field to a predetermined maximum residue amount threshold. Thereafter, in the event that the value of the monitored residue amount exceeds the maximum residue amount threshold (thereby indicating that too much residue is present within the path of the implement 10), the controller 128 may be configured to transmit control signals 146 to the actuator 110. Such control signals 146 may instruct the actuator 110 to increase the downforce being applied to the residue removal device 46 in a manner that causes the residue removal device 46 to more aggressively break up and sweep residue out of the path of the implement 10.

Additionally, in one embodiment, the controller 128 may be configured to control the operation of the furrow closing assembly 36 based on the monitored operational parameter(s). Specifically, as shown in FIG. 3, the controller 128 may be communicatively coupled to one or more components of the furrow closing assembly 36, such as the actuator 104, via a wired or wireless connection to allow control signals 146 to be transmitted from the controller 128 to the actuator 104. As such, the controller 128 may be configured to transmit control signals 146 to actuator 110 instructing the actuator 110 to adjust the position of the furrow closing assembly 36 relative to the ground. For example, when it is determined that the monitored operational parameter(s) has exceeded the associated operational parameter range(s) or the furrow closing assembly 36 is otherwise plugged, the controller 128 may be configured to transmit control signals 146 to the actuator 104 instructing the actuator 104 to move the furrow closing assembly 36 from the operational position to the raised position and subsequently back to the operational position. Such movement of the furrow closing assembly 36 may remove the soil and/or residue trapped within the furrow closing assembly 36. Alternatively, when it is determined that the monitored operational parameter(s) has exceeded the associated operational parameter range(s) or the furrow closing assembly 36 is otherwise plugged, the controller 128 may be configured to transmit control signals 146 to actuator 110 instructing the actuator 110 to adjust the downforce applied to the furrow closing assembly 36.

Figure 4:
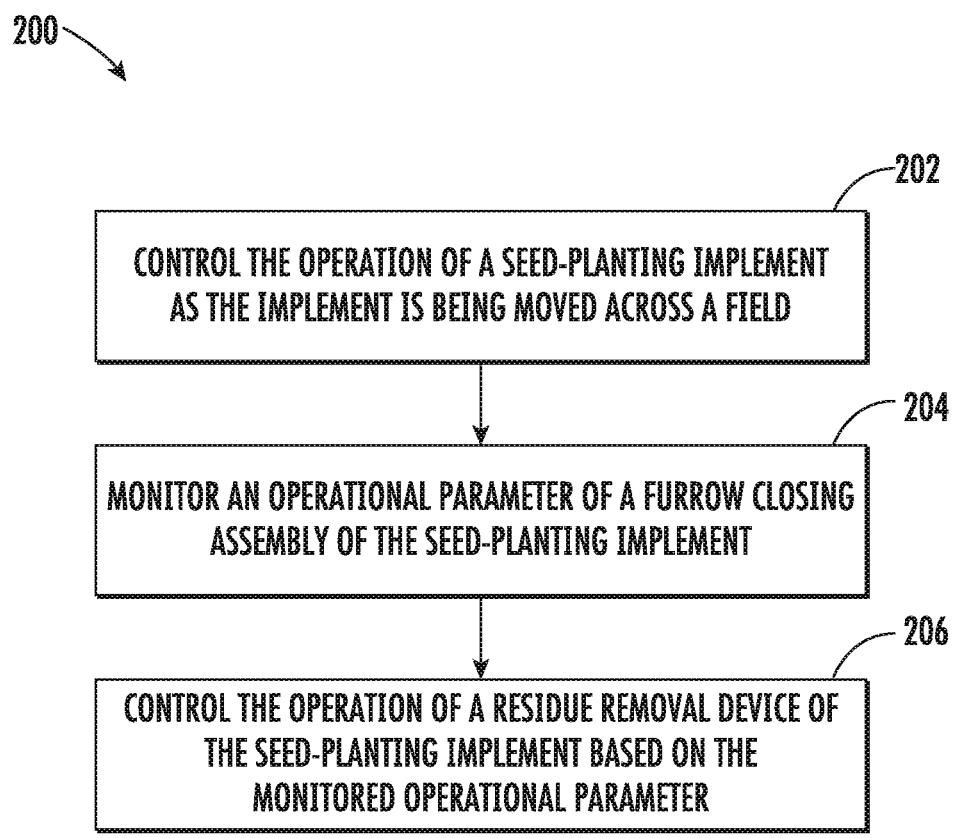
FIG. 4 illustrates a flow diagram of one embodiment of a method for controlling the operation of a residue removal device of a seed-planting implement in accordance with aspects of the present subject matter.

Referring now to FIG. 4, a flow diagram of one embodiment of a method 200 for controlling the operation of a residue removal device of a seed-planting implement is illustrated in accordance with aspects of the present subject matter. In general, the method 200 will be described herein with reference to the seed-planting implement 10 and the system 100 described above with reference to FIGS. 1-3. However, it should be appreciated by those of ordinary skill in the art that the disclosed method 200 may generally be utilized to control the operation of a residue removal device of any seed-planting implement having any suitable implement configuration and/or in connection with any system having any suitable system configuration. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 4, at (202), the method 200 may include controlling, with a computing device, the operation of a seed-planting implement as the implement is being moved across a field. For instance, as described above, a controller 128 may be configured to control the operation of one or more components of a seed-planting implement 10 as the implement 10 is being moved across the field.

Additionally, at (204), the method 200 may include monitoring, with the computing device, an operational parameter of a furrow closing assembly of the seed-planting implement. For instance, as described above, the controller 128 may be communicatively coupled to one or more sensors, such as a rotational speed sensor 116 and/or a depth sensor 118, which are configured to capture data indicative of one or more operational parameters of the furrow closing assembly 36 of the implement 10. As such, the controller 128 may be configured to receive operational parameter data 136 from the rotational speed sensor 116 and/or the depth sensor 118.

Moreover, as shown in FIG. 4, at (206), the method 200 may include controlling, with the computing device, the operation of a residue removal device of the seed-planting implement based on the monitored operational parameter. For instance, as described above, the controller 128 may be configured to transmit control signals 146 to a residue removal device actuator 110 to adjust one or more operating parameters of a residue removal device 46, such as the downforce being applied thereto, based on the monitored operational parameter(s).

It is to be understood that the steps of the method 200 are performed by the controller 128 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 128 described herein, such as the method 200, is implemented in software code or instructions which are tangibly stored on a tangible computer readable medium. The controller 128 loads the software code or instructions via a direct interface with the computer readable medium or via a wired and/or wireless network. Upon loading and executing such software code or instructions by the controller 128, the controller 128 may perform any of the functionality of the controller 128 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for controlling the operation of a residue removal device of a seed-planting implement, the system comprising:
   a residue removal device configured to remove residue from a path of the seed-planting implement;
   a furrow closing assembly including at least one closing disc, the furrow closing assembly configured to close a furrow formed in soil by the seed-planting implement;
   a sensor configured to capture data indicative of an operational parameter of the furrow closing assembly, the operational parameter comprising at least one of a rotational speed of the at least one closing disc, a depth to which the at least one closing disc penetrates the soil, and a draft load applied to the at least one closing disc; and
   a controller communicatively coupled to the sensor, the controller configured to monitor the operational parameter based on the data received from the sensor, the controller further configured to control an operation of the residue removal device based on the monitored operational parameter.

2. The system of claim 1, wherein the controller is further configured to monitor the operational parameter relative to a predetermined operational parameter range and initiate a control action when the monitored operational parameter exceeds a predetermined maximum parameter value of the predetermined parameter range or falls below a predetermined minimum parameter value of the predetermined parameter range.

3. The system of claim 2, wherein the controller is further configured to determine that the furrow closing assembly is plugged when the monitored operational parameter exceeds a predetermined maximum parameter value of the predetermined parameter range or falls below a predetermined minimum parameter value of the predetermined parameter range.

4. The system of claim 2, wherein the control action comprises notifying an operator of the seed-planting implement that the monitored operational parameter has fallen outside of the predetermined parameter range.

5. The system of claim 2, wherein the control action comprises adjusting a downforce applied to the residue removal device.

6. The system of claim 2, wherein the control action comprises adjusting at least one of a position of the furrow closing assembly between an operational position relative to the ground and a raised position relative to the ground or a downforce being applied to the furrow closing assembly.

7. The system of claim 1, wherein the operational parameter comprises the rotational speed of the at least one closing disc, the controller further configured to adjust the downforce applied to the residue removal device when it is determined that the monitored rotational speed has fallen below a predetermined minimum speed value.

8. The system of claim 1, wherein the operational parameter comprises the depth to which the at least one closing disc penetrates the soil, the controller further configured to adjust the downforce applied to the residue removal device when it is determined that the monitored depth has fallen below a predetermined minimum depth value.

9. The system of claim 1, wherein the sensor comprises at least one of a vision-based sensor or a radio detection and ranging (RADAR) sensor configured to capture data indicative of plugging of the furrow closing assembly.

10. The system of claim 1, further comprising:
a secondary sensor configured to capture secondary data indicative a field condition of a field across which the seed-planting implement is being moved, the controller being communicatively coupled to the secondary sensor, the controller further configured to monitor the field condition based the secondary data received from the secondary sensor and control the operation of the residue removal device based on the monitored operational parameter and the monitored field condition.

11. The system of claim 10, wherein the controller is further configured to identify an amount of residue within at least a portion of the field based on the captured secondary data and, when it is determined that the amount of residue within the at least a portion of the field exceeds a predetermined residue amount, increase the downforce applied to the residue removal device.

12. The system of claim 10, wherein the field condition comprises a moisture content of the soil within the field.

13. The method of claim 1, wherein the operational parameter comprises the rotational speed of the at least one closing disc, further comprising:
when the monitored rotational speed falls below a predetermined minimum speed value, adjusting, with the computing device, the downforce applied to the residue removal device.

14. A method for controlling the operation of a residue removal device of a seed-planting implement, the residue removal device configured to remove residue from a path of the seed-planting implement, the method comprising:
controlling, with a computing device, an operation of the seed-planting implement as the implement is being moved across the field, the implement including a furrow closing assembly having at least one closing disc, the furrow closing assembly configured to close a furrow formed in the by the seed-planting implement;
monitoring, with the computing device, an operational parameter of the furrow closing assembly, the operational parameter comprising at least one of a rotational speed of the at least one closing disc, a depth to which the at least one closing disc penetrates the soil, and a draft load applied to the at least one closing disc; and
controlling, with the computing device, an operation of the residue removal device based on the monitored operational parameter.

15. The method of claim 14, wherein monitoring the operational parameter comprises monitoring, with the computing device, the operational parameter relative to a predetermined operational parameter range, the method further comprising:
when the monitored operational parameter exceeds a predetermined maximum parameter value of the predetermined parameter range or falls below a predetermined minimum parameter value of the predetermined parameter range, initiating, with the computing device, a control action.

16. The method of claim 15, further comprising:
when the monitored operational parameter exceeds a predetermined maximum parameter value of the predetermined parameter range or falls below a predetermined minimum parameter value of the predetermined parameter range, determining, with the computing device, that the furrow closing assembly is plugged.

17. The method of claim 15, wherein the control action comprises notifying an operator of the seed-planting implement that the monitored operational parameter has fallen outside of the predetermined parameter range.

18. The method of claim 15, wherein the control action comprises adjusting a downforce applied to the residue removal device.

19. The method of claim 15, wherein the control action comprises adjusting at least one of a position of the furrow closing assembly between an operational position relative to the ground and a raised position relative to the ground or a downforce being applied to the furrow closing assembly.

20. The method of claim 14, wherein the operational parameter comprises the depth to which the at least one closing disc penetrates the soil, the method further comprising:
when the monitored depth falls below a predetermined minimum depth value, adjusting, with the computing device, the downforce applied to the residue removal device.

* * * * *